(12) United States Patent
Piedmont et al.

(10) Patent No.: US 8,920,587 B2
(45) Date of Patent: Dec. 30, 2014

(54) METHOD OF MAKING A SMALL-DIAMETER COMPOSITE TUBE

(75) Inventors: Gregory Piedmont, Helendale, CA (US); Mike Malis, Stevenson Ranch, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 924 days.

(21) Appl. No.: 13/090,984

(22) Filed: Apr. 20, 2011

(65) Prior Publication Data
US 2012/0267000 A1 Oct. 25, 2012

(51) Int. Cl.
B29C 53/42 (2006.01)
B29C 53/46 (2006.01)
F16L 9/17 (2006.01)
B29K 105/08 (2006.01)

(52) U.S. Cl.
CPC ............... *B29C 53/42* (2013.01); *B29C 53/46* (2013.01); *F16L 9/17* (2013.01); *B29K 2105/0872* (2013.01)
USPC .......................................... 156/218; 493/269

(58) Field of Classification Search
None
See application file for complete search history.

(56) References Cited

U.S. PATENT DOCUMENTS

| | | | |
|---|---|---|---|
| 2,690,412 A | 1/1949 | Nebesar | |
| 2,674,557 A | 3/1949 | Boggs | |
| 2,711,982 A | 2/1951 | Straka | |
| 2,795,241 A | 6/1954 | Caldwell et al. | |
| 2,976,889 A | 11/1958 | Cannady, Jr. | |
| 3,054,428 A | 10/1959 | Crawford | |
| 3,131,615 A | 5/1964 | Schur | |
| 3,619,361 A | 11/1971 | Schoggl | |
| 3,994,656 A | 11/1976 | Van Ausdall | |
| 4,478,898 A | 10/1984 | Kato | |
| 4,706,488 A | 11/1987 | Williamson | |
| 4,818,460 A | 4/1989 | Nied | |
| 4,923,541 A | 5/1990 | Burger | |
| 4,963,301 A | 10/1990 | Davis et al. | |
| 5,114,762 A | 5/1992 | Bontems et al. | |
| 5,585,062 A | 12/1996 | Muramatsu et al. | |
| 5,626,707 A | 5/1997 | Hadzicki et al. | |
| 5,840,347 A | 11/1998 | Muramatsu et al. | |
| 2002/0071920 A1 | 6/2002 | Obeshaw | |
| 2006/0046867 A1 | 3/2006 | Murphy | |
| 2010/0159762 A1 | 6/2010 | Laurent et al. | |

FOREIGN PATENT DOCUMENTS

| | | |
|---|---|---|
| EP | 0 707 941 | 4/1996 |
| GB | 1 365 881 | 9/1974 |
| GB | 1 429 309 | 3/1976 |
| JP | 54-124080 | 9/1979 |

*Primary Examiner* — Barbara J Musser
(74) *Attorney, Agent, or Firm* — McDermott Will & Emery LLP

(57) ABSTRACT

A small-diameter composite tube may be formed by hand rolling. A slip sheet may be placed on a work surface, and then a composite sheet may be placed on the slip sheet. A mandrel may be placed at a first edge of the composite sheet, and a portion of the slip sheet may be folded over the mandrel, and the first edge of the composite sheet, such that the mandrel is enclosed in the slip sheet. A compression bar may then be placed on the folded-over portion of the slip sheet and force may be applied, causing the slip sheet to contact the mandrel. Then, the folded-over portion of the slip sheet may be pulled away from the mandrel while force is maintained on the compression bar. As the folded-over portion of the slip sheet is pulled, the composite sheet may wind around the mandrel, forming the composite tube.

15 Claims, 4 Drawing Sheets

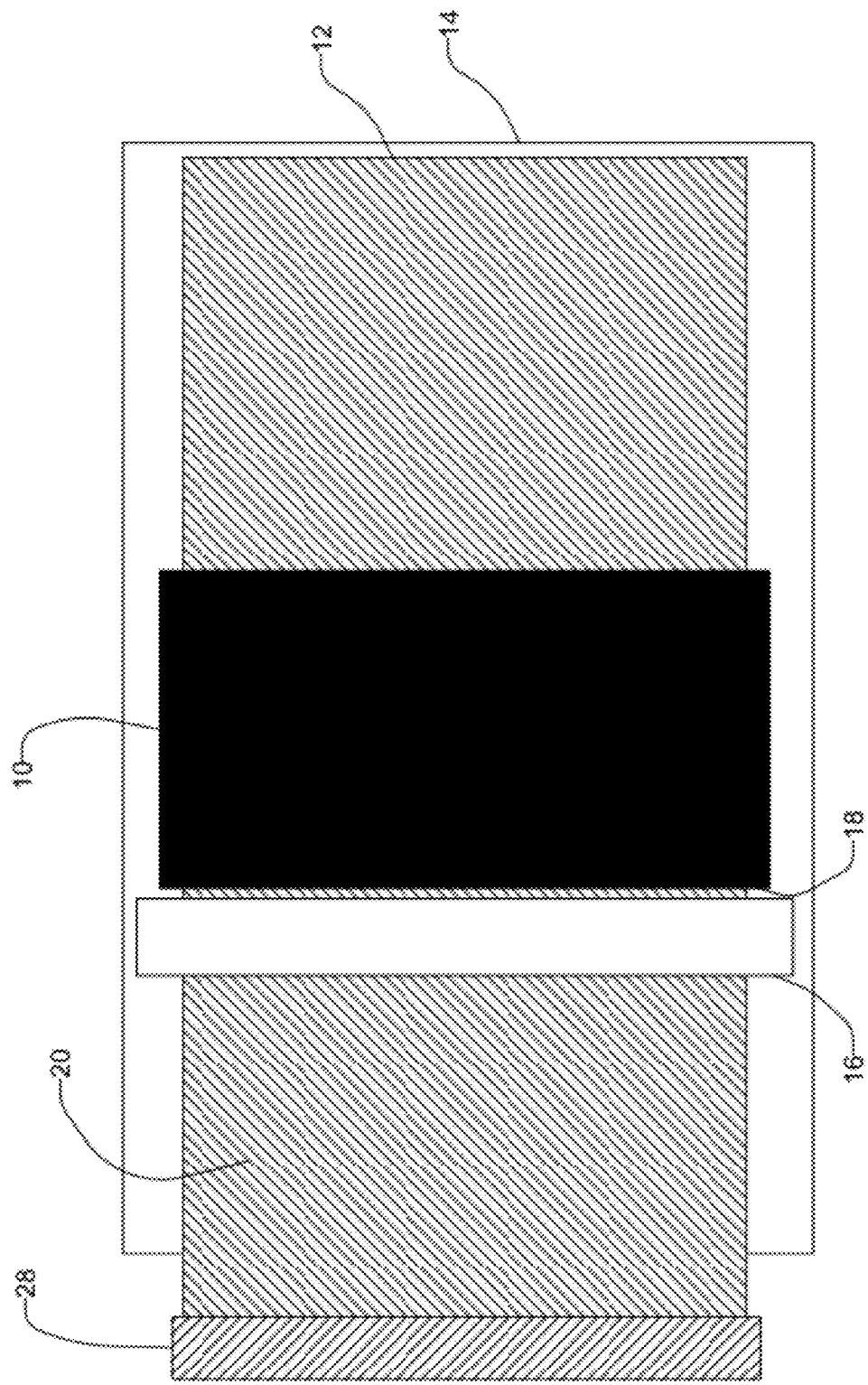

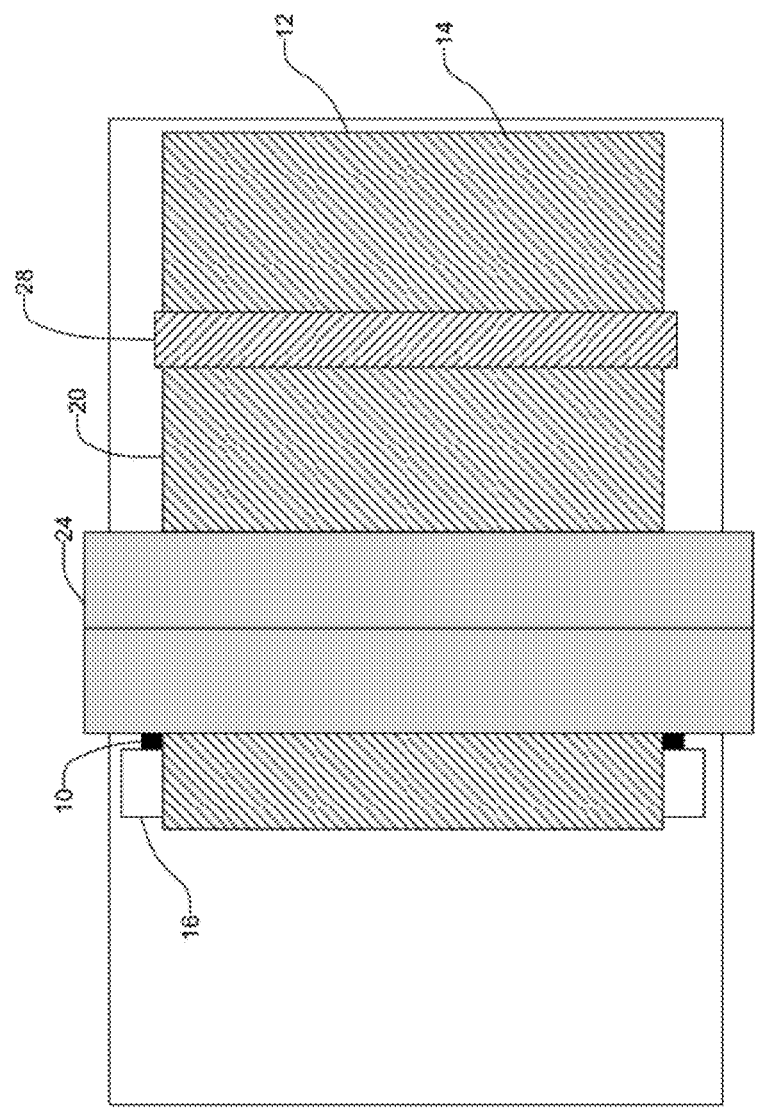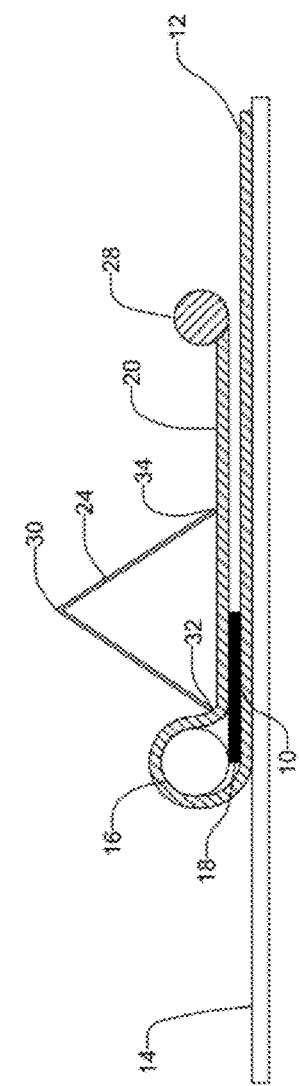
FIG. 2A
FIG. 2B

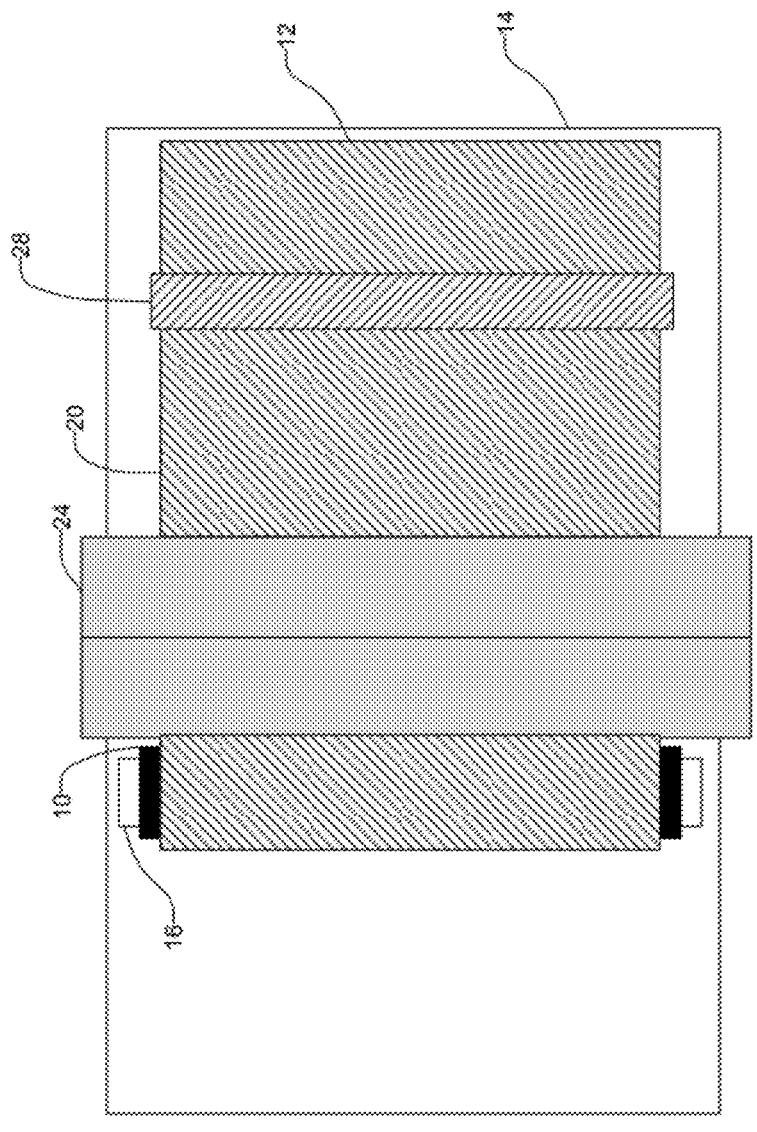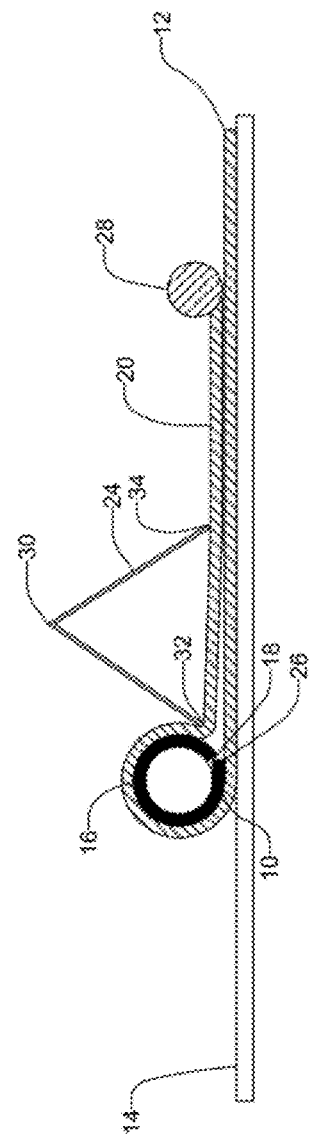
FIG. 3A
FIG. 3B

METHOD OF MAKING A SMALL-DIAMETER COMPOSITE TUBE

STATEMENT AS TO RIGHTS TO INVENTIONS MADE UNDER FEDERALLY SPONSORED RESEARCH OR DEVELOPMENT

Not applicable.

FIELD

The present disclosure generally relates to formation of composite tubes and, in particular, relates to methods of hand-forming small-diameter composite tubes.

BACKGROUND

Composite tubes may be formed by filament winding or extrusion. However, both methods require significant capital investment (e.g., in the form of tooling costs), which may be undesirable for production of small quantities of a particular design. A change in the design diameter or length may require costly and time-consuming adjustments to the equipment used for creating these composite tubes. Additionally, filament winding may not provide composite tubes with small diameters.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The present disclosure provides methods for forming a small-diameter composite tube. The methods may include placing a slip sheet on a work surface, then placing a composite sheet on the slip sheet. An operator may place a mandrel at a first edge of the composite sheet, and fold a portion of the slip sheet over the mandrel and the first edge of the composite sheet, such that the slip sheet encloses the mandrel. The user may then place a compression bar on the folded-over portion of the slip sheet and apply force, causing the slip sheet to contact the mandrel. Then, the operator may pull the folded-over portion of the slip sheet away from the mandrel while maintaining force on the compression bar. As the operator pulls the folded-over portion of the slip sheet, the composite sheet may wind around the mandrel, forming the composite tube.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 1 is a top view of an exemplary setup for forming a small-diameter composite tube from a composite sheet in accordance with one aspect of the present disclosure.

FIG. 2A is top view of the setup of FIG. 1, after a portion of a slip sheet has been folded over a mandrel in accordance with one aspect of the present disclosure.

FIG. 2B is a side view of the setup of FIG. 2A in accordance with one aspect of the present disclosure.

FIG. 3A is top view of the setup of FIGS. 1, 2A, and 2B, after the folded-over portion of the slip sheet has been pulled away from the mandrel in accordance with one aspect of the present disclosure.

FIG. 3B is a side view of the setup of FIG. 3A in accordance with one aspect of the present disclosure.

DETAILED DESCRIPTION

Figure 4:
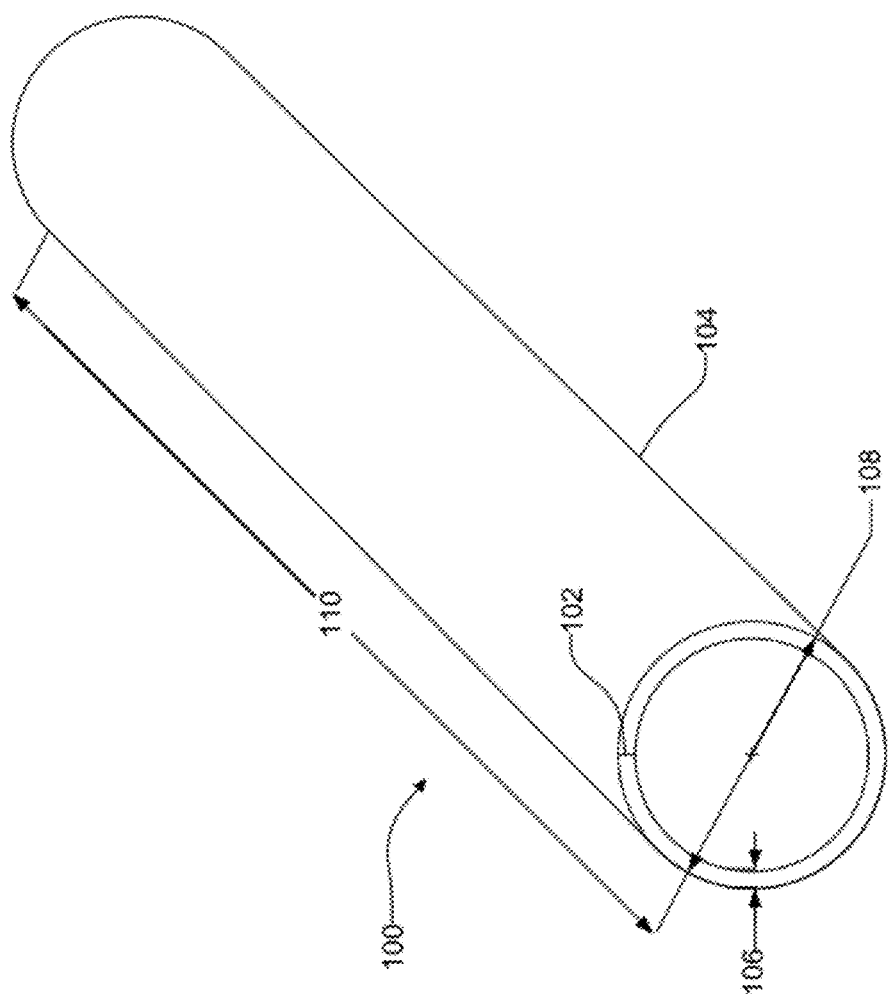
FIG. 4 illustrates a perspective view of a composite tube formed using the setup of FIGS. 1-3B in accordance with one aspect of the present disclosure.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

A composite tube 100 (shown in FIG. 4) may be formed by hand rolling a composite sheet 10 into the composite tube 100. Referring now to FIG. 1, an operator may place a slip sheet 12 on a work surface 14, and place the composite sheet 10 on the slip sheet 12. The operator may then place a mandrel 16 at one edge 18 of the composite sheet 10. Then, the operator may fold a portion 20 of the slip sheet 12 over the mandrel 16 and first edge 18 (e.g., the edge nearest the operator) of the composite sheet 10. As illustrated in FIGS. 2A and 2B, after the operator has folded over the portion 20, the slip sheet 12 may encircles or encloses the mandrel 16 and the first edge 18 of the composite sheet 10 therein. The operator may place a compression bar 24 on the folded over portion 20 of the slip sheet 12 and apply downward or compressive force to the compression bar 24 such that the slip sheet 12 contacts the mandrel 16. Such contact between the mandrel 16 and the slip sheet 12 may be direct, as illustrated in FIG. 2B. While evenly maintaining force on the compression bar 24 with one hand, the operator may pull the folded-over portion 20 of the slip sheet 12 away from the mandrel 16 while, causing the first edge of the composite sheet 10 to rotate around the mandrel 16.

Referring now to FIGS. 3A and 3B, as the composite sheet 10 rotates around the mandrel 16, the contact between the mandrel 16 and the slip sheet 12 may become indirect contact, with the composite sheet 10 separating the slip sheet 12 and the mandrel 16. The mandrel 16 may rotate as the operator pulls the folded-over portion 20 of the slip sheet 12. The operator may continue pulling the folded-over portion 20, and thus the winding around the mandrel 16 may continue until the first edge 18 of the composite sheet 10 contacts another portion 26 (shown in FIG. 3B) of the composite sheet 10 forming a composite tube 100. At this time, the operator may stop pulling the folded-over portion 20 of the slip sheet 12 and the operator may cut away a portion of the composite sheet 10 not used in the composite tube 100. Alternatively, the composite sheet 10 may be pre-cut, such that the operator uses the entire composite sheet 10 for the composite tube 100. Thus, a composite tube 100 having walls that are formed of, and as thin as, a single layer of the composite sheet 10 may be hand formed. Alternatively, in some aspects, the composite sheet 10 may be longer, and the operator may continue pulling the folded over portion 20 of the slip sheet 12 beyond a single rotation. Thus, the methods described may also be used to make a composite tube 100 having a wall formed of more than one layer of composite sheet 10.

Once the composite sheet 10 forms the composite tube 100, the operator may remove the compression bar 24 and vacuum bag the composite tube 100 to compact the plies or layers of material and force them to the shape of the mandrel 16 while removing air bubbles and other imperfections. The operator may vacuum bag the composite tube 100 with the slip sheet 12 and the mandrel 16 in place. Additionally, the operator may heat the composite tube 100 with the mandrel 16 in place. The time and temperature of such heating may depend on the materials used and the properties desired. Such heating may allow the composite tube 100 to harden, or otherwise cure. Heating may also cause the mandrel 16 to expand, causing the composite sheet 10 to stretch, reducing imperfections. Additionally, the mandrel 16 may subsequently contract more than the composite tube 100 when cooled. If the outer diameter of the mandrel 16 is smaller than the inner diameter of the composite tube 100, the operator can remove the mandrel 16 more easily.

Once the process of forming the composite tube 100 is complete, the operator may remove or separate the slip sheet 12 from engaging an exterior surface of the composite tube 100. Similarly, the operator may remove or separate the mandrel 16 engagement with an interior surface of the composite tube 100. The removal of the slip sheet 12 and the mandrel 16 may occur immediately following formation of the composite tube 100, or, when vacuum bagging or heat treatment are used, after such treatment is complete.

Referring now to FIG. 4, the composite tube 100 formed by such a method may be formed from the composite sheet 10 or another material. In one aspect, the composite tube 100 is formed of a single-ply prepreg material tape joined along an edge 102 to form a cylinder 104. The tape may have a thickness of about 2.5 to about 5 mils, such that a wall thickness 106 of the composite tube 100 is between about 2.5 mils and about 5 mils. The composite tube 100 may be a small-diameter composite tube having an outer diameter 108 of between about 3/16" and about 3/8" diameter, and in some aspects, up to about 1/2". The composite tube 100 may have a length 110 of up to about 24", and in some aspects between about 18" and about 24".

Referring generally to FIG. 1, the composite sheet 10 may be formed of a "pre-impregnated" composite ("prepreg") material, such as a single-ply unidirectional carbon matrix, or other sheet material useful in creating composite structures. The composite sheet 10 may be a tape, or a fabric, depending on design parameters. In some aspects, the composite sheet 10 may include a resin or other composition that is tacky and will readily adhere, when contacting itself. While any fiber composite may be used for the composite sheet 10, in one aspect, it may be advantageous to use very thin unidirectional composites with all or most of the fibers oriented along the length of the mandrel direction. Exemplary materials suitable for use as the composite sheet 10 include, but are not limited to, braided triaxial fabric composed of T-300 1K, plain weave prepreg fabric T700S-12K-50C, both available from Toray Industries Inc., or a unidirectional tape such as MTM45-1, available from Advanced Composites Group Ltd., or IM7-GP-145, available from Hexcel Corporation. Graphite fiber tapes, such as aerospace grade IM-7 (High Strength), available from Hexcel Corporation, and spacecraft grade M-55J (High Stiffness), available from Toray Industries Inc., may also be used. The composite sheet 10 may have a thickness of about 2.5 mils to about 5 mils, such that the composite tube 100 formed from the composite sheet 10 has a wall thickness of about 2.5 mils to about 5 mils.

The slip sheet 12 may be formed of a variety of materials. In some aspects, the materials forming the slip sheet 12 may be flexible, to allow for tight contact between the slip sheet 12 and the mandrel 16 during rolling. The slip sheet 12 may be formed of Teflon or other nonstick film or material, to allow the composite sheet 10 to be easily separated from the slip sheet 12 when the composite tube is complete. In one aspect, the slip sheet 12 includes a sheet of A-4000 or other release film, which may be suitable for use during heating. The slip sheet 12 may have a handle 28 at a far edge of the folded-over portion 20. Thus, the handle 28 can make pulling the folded-over portion 20 of the slip sheet 12 easier. The operator may simply grip the handle 28 and pull it away from the mandrel 16.

The work surface 14 may be a foam mat or other surface, such as a table, floor, or other support structure. When the work surface 14 is a foam mat, and the compression bar 24 presses into the folded-over portion 20 of the slip sheet 12, the folded-over portion 20 may, in turn, press into a portion of the slip sheet 12 in contact with the foam mat. The foam mat may provide a flexible surface, allowing for more uniform contact between, or uniform distribution of force between, the compression bar 24 and the material surrounding the mandrel 16.

The mandrel 16 may be formed of Teflon or other nonstick material, to allow the operator to separate the composite sheet 10 from the mandrel 16 when the composite tube 100 is complete. The mandrel 16 may have a small diameter, to provide the composite tube 100 formed thereon with a small diameter. In some aspects, the mandrel 16 may have a diameter of between about 3/16" and about 3/8" diameter, and in some aspects, up to about 1/2". The mandrel 16 may be formed of a material with a higher thermal coefficient of expansion than the composite sheet 10, such that after being heated and cooled, the mandrel has a smaller diameter than the composite tube 100, allowing for the mandrel 16 to be separated from the composite tube 100 (e.g., the composite tube 100 may slide off of the mandrel 16"). Alternatively, the mandrel 16 may be constructed of a material, such as silicone, that when the mandrel 16 experiences a tensile load (e.g., pulling on the ends), the diameter decreases, allowing for the composite tube 100 to be separated from the mandrel 16.

The compression bar 24 may ensure that all slack in the composite sheet 10 is removed and that the composite sheet 10 is rolling evenly about the mandrel 16. The compression bar 24 may be any elongated body that has at least one constant edge along a length thereof. For example, the compression bar 24 may be an angle extrusion, as illustrated in FIGS. 2B and 3B. Thus, the compression bar 24 may have a corner 30, a front edge 32, and a back edge 34, each extending along the length of the compression bar 24. Thus, when the operator places the compression bar 24 on the folded-over portion 20 of the slip sheet 12 and applies pressure, the front edge 32 may push a portion of the slip sheet 12 toward the mandrel 16. The back edge 34 of the compression bar 24 may provide stability and may help prevent relative movement between the work surface 14 and the portion of the slip sheet 12 in contact with the work surface 14. Thus, the compression bar 24 may ensure that the composite sheet 10 winds tightly around the mandrel 16, reducing imperfections such as wrinkles and bubbles.

Forming composite tubes using sheet materials, as disclosed in the present disclosure, may provide advantages over previous methods. For example, sheets may be fabricated to meet a wider variety of design parameters than filament for filament winding. Additionally, the hand formed rolling of a sheet to make a small-diameter composite tube may be done by hand, saving significant capital investment cost, while allowing for rapid adoption of design modifications. Using the methods described above, a composite tube may be built, by hand, at low cost. The composite tube may be tailored to specific design requirements using prepreg fabric, or any of a number of materials that may be unavailable for other methods of forming small-diameter composite tubes.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be modified from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "front," "back" and the like as used in this disclosure should be understood as referring to an arbitrary frame of reference, rather than to the ordinary gravitational frame of reference. Thus, a front edge, and a rear edge may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method of forming a composite tube comprising:
   placing a slip sheet on a work surface;
   placing a composite sheet on the slip sheet;
   placing a mandrel at a first edge of the composite sheet;
   folding a portion of the slip sheet over the mandrel and the first edge of the composite sheet to enclose the mandrel and the first edge of the composite sheet therein;
   placing a compression bar on the folded-over portion of slip sheet and applying force to the compression bar, such that the slip sheet contacts the mandrel; and
   pulling the folded-over portion of the slip sheet away from the mandrel, while maintaining force on the compression bar, so as to wind a portion of the composite sheet around the mandrel,
   wherein the compression bar comprises an angle extrusion having a corner and two edges, each extending along a length of the compression bar, and
   wherein placing a compression bar on the folded-over portion of the slip sheet comprises contacting the slip sheet with the two edges.

2. The method of claim 1, comprising continuing to pull the folded-over portion of the slip sheet away from the mandrel, until the first edge of the composite sheet contacts another portion of the composite sheet.

3. The method of claim 1, comprising cutting the composite sheet, such that a wall of the composite tube is formed of a single layer of the composite sheet.

4. The method of claim 1, further comprising vacuum bagging the composite sheet, with the slip sheet and the mandrel in place.

5. The method of claim 1, wherein the composite sheet forms the composite tube, the method further comprising removing the compression bar, the slip sheet, and the mandrel.

6. The method of claim 1, further comprising heating the composite sheet, with the mandrel in place.

7. The method of claim 1, wherein:
   the slip sheet comprises a handle at an edge of the folded-over portion, and
   pulling the folded-over portion of the slip sheet comprises pulling the handle away from the mandrel.

8. The method of claim 1, wherein maintaining force on the compression bar comprises evenly maintaining the force on the compression bar.

9. The method of claim 1, wherein the work surface comprises a foam mat.

10. The method of claim 1, wherein the composite tube comprises a small-diameter composite tube.

11. The method of claim 1, wherein the slip sheet comprises Teflon.

12. The method of claim 1, wherein the mandrel comprises Teflon.

13. The method of claim 1, wherein the composite sheet comprises a prepreg material.

14. The method of claim 1, wherein the composite sheet comprises a tape.

15. The method of claim 1, wherein the composite tube has a wall thickness of about 2.5 to about 5 mils.

* * * * *